US007993559B2

(12) United States Patent
Dontula et al.

(10) Patent No.: US 7,993,559 B2

(45) Date of Patent: Aug. 9, 2011

(54) METHOD OF MAKING THERMAL IMAGING ELEMENTS

(75) Inventors: Narasimharao Dontula, Rochester, NY (US); Somsack Chang, Pittsford, NY (US); Brian Thomas, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 43 days.

(21) Appl. No.: 12/490,455

(22) Filed: Jun. 24, 2009

(65) Prior Publication Data

US 2010/0327480 A1 Dec. 30, 2010

(51) Int. Cl.
*B29C 47/04* (2006.01)

(52) U.S. Cl. ................. 264/173.12; 264/171.1; 264/212

(58) Field of Classification Search ........................ None
See application file for complete search history.

(56) References Cited

U.S. PATENT DOCUMENTS

| | | | |
|---|---|---|---|
| 4,734,396 A | 3/1988 | Harrison et al. | |
| 5,244,861 A | 9/1993 | Campbell et al. | |
| 5,420,095 A | 5/1995 | Bodem et al. | |
| 5,814,258 A * | 9/1998 | Ogawa et al. | 264/173.12 |
| 5,876,857 A * | 3/1999 | Schuhmann et al. | 428/515 |
| 6,372,689 B1 | 4/2002 | Kuga et al. | |
| 6,897,183 B2 | 5/2005 | Arrington et al. | |
| 7,091,157 B2 | 8/2006 | Kung et al. | |
| 7,521,173 B2 | 4/2009 | Dontula et al. | |
| 2004/0058817 A1 | 3/2004 | Ueno et al. | |
| 2004/0167020 A1 | 8/2004 | Arrington et al. | |
| 2008/0220353 A1 | 9/2008 | Dontula et al. | |

* cited by examiner

*Primary Examiner* — Monica A Huson
(74) *Attorney, Agent, or Firm* — J. Lanny Tucker

(57) ABSTRACT

A method of co-extrusion is used to prepare a thermal imaging element such as a thermal dye receiver element. In this method, two or three of an image receiving layer, an antistatic tie layer, and a compliant layer are co-extruded and these co-extruded multiple layers can be disposed on a support to provide a smooth outer surface and reduced delamination among layers especially in a high humidity environment.

18 Claims, No Drawings

METHOD OF MAKING THERMAL IMAGING ELEMENTS

FIELD OF THE INVENTION

The present invention relates to a method of preparing thermal dye transfer image receiver elements by co-extrusion of multiple layers including co-extrusion of two or more of an antistatic tie layer, an image receiving layer, and a compliant layer. The present invention also relates to a method of making extruded imaging elements such as thermal dye transfer receiver elements in which an extruded antistatic tie layer is adhered on one side to a skin layer which is adhered to an extruded compliant layer and an image receiving layer (optionally extruded) on its opposite side.

BACKGROUND OF THE INVENTION

In recent years, thermal transfer systems have been developed to obtain prints from pictures that have been generated from a camera or scanning device. According to one way of obtaining such prints, an electronic picture is first subjected to color separation by color filters. The respective color-separated images are then converted into electrical signals. These signals are then transmitted to a thermal printer. To obtain the print, a cyan, magenta or yellow dye-donor element is placed face-to-face with a dye receiver element. The two are then inserted between a thermal printing head and a platen roller. A line-type thermal printing head is used to apply heat from the back of the dye-donor sheet. The thermal printing head has many heating elements and is heated up sequentially in response to one of the cyan, magenta or yellow signals. The process is then repeated for the other colors. A color hard copy is thus obtained which corresponds to the original picture viewed on a screen.

Dye receiver elements used in thermal dye transfer generally include a support (transparent or reflective) bearing on one side thereof a dye image-receiving layer, and optionally additional layers, such as a compliant or cushioning layer between the support and the dye receiving layer. The compliant layer provides insulation to keep heat generated by the thermal head at the surface of the print, and also provides close contact between the donor ribbon and receiving sheet which is essential for uniform print quality.

Various approaches have been suggested for providing such a compliant layer. U.S. Pat. No. 5,244,861 (Campbell et al.) describes a composite film comprising a microvoided core layer and at least one substantially void-free thermoplastic skin layer. Such an approach adds an additional manufacturing step of laminating the previously created composite film to the support, and film uniformity can be variable resulting in high waste factors. U.S. Pat. No. 6,372,689 (Kuga et al.) describes the use of a hollow particle layer between the support and dye receiving layer. Such hollow particles layers are frequently coated from aqueous solutions that necessitate a powerful drying stage in the manufacturing process and may reduce productivity. In addition, the hollow particles with varied size and size distribution may result in increased surface roughness in the finished print that reduces surface gloss. It would be advantageous to provide a compliant layer that enables a high gloss print to be obtained. It would also be advantageous if the technology used to provide such a compliant layer also enables a matte print to be obtained if a low gloss finish is desired. It would also be advantageous if the technology used enables any intermediate finishes between glossy and matte finishes.

U.S. Pat. No. 6,897,183 (Arrington et al.) describes a process for making a multilayer film, useful in an image recording element, wherein the multilayer film comprises a support and an outer or surface layer and between the support and the outer layer is an "antistatic tie layer" comprising a thermoplastic antistatic polymer or composition having preselected antistatic properties, adhesive properties, and viscoelastic properties. Such a multilayer film may be used in making a thermal-dye-transfer receiver element comprising a support and a dye receiving layer wherein between the support and the dye receiving layer is a tie layer. However, this patent fails to mention the importance of tie layer adhesion to the dye receiving layer and to the support during printing and immediately after the print. Also, no mention is made of the importance of printing under hot and humid conditions, and lack of humidity sensitivity of the tie layer compositions. U.S. Patent Application Publication 2004/0167020 (Arrington et al.) has similar disclosure in that it does not make any reference to adhesion of the dye receiver layer to the support during printing, immediately after printing, printing under hot and humid conditions, or humidity sensitivity of tie layer compositions.

Known polymer compliant composite laminates used on the faceside (imaging side) of dye-thermal receiver elements generally have a top skin layer of polypropylene (PP) onto which can be extruded a dye receiver layer (DRL) containing a polyester/polycarbonate blend. A known tie layer used between the composite laminate support and the dye receiving layer (DRL) is antistatic and is a blend of 70 wt. % PELESTAT® 300 (polyethylene-polyether copolymer) and 30 wt. % polypropylene (PP). The rheology of these two components is such that PELESTAT® 300 encapsulates the polypropylene (PP), so that the continuous phase in the tie layer is PELESTAT® 300. The PELESTAT® 300 acts as an antistatic material as well as an adhesive component to polymer laminate support skin layer and the dye receiving layer (DRL). This tie layer, however, is significantly humidity sensitive, has poor adhesion, and does not survive borderless printing (edge to edge) when tested under hot and humid conditions such as 36° C./86% RH. Moreover, as stated previously, the application of a composite laminate film requires an additional manufacturing step.

There remains a need to provide a compliant layer and other layers in the receiver element using technology that is highly efficient from a manufacturing viewpoint and that provides enhanced adhesion with supports and overlying layers (such as DRL's) extruded onto the substrates, and thus avoiding delamination during printing, especially when adhesion is negatively affected by humidity. It would also be desirable for the dye receiving layer (DRL) to be readily applied to the underlying support with adequate adhesion. It further would be desirable for the compliant layer and tie layers to be co-extrudable to reduce the number of manufacturing operations, or even to co-extrude the compliant layer, antistatic tie layer, and dye receiving layers for most efficient manufacture. It is also desirable that the extruded layer technology would allow either a glossy or matte print to be obtained.

SUMMARY OF THE INVENTION

The present invention provides a method of making a thermal imaging element wherein the imaging element is either a glossy or matte material. This method comprises:

providing a support;

applying to the support, in order:

a non-voided compliant layer that comprises from about 10 to about 40 weight % of at least one elastomeric polymer, an antistatic tie layer, and an image receiving layer, wherein all three of the non-voided compliant layer, antistatic tie layer, and image receiving layer are extruded onto the support, and at least two of the layers are co-extruded.

In many embodiments, all three of the non-voided compliant layer, antistatic tie layer, and image receiving layer are co-extruded onto the support.

In some embodiments of this invention, a method of forming a thermal imaging element comprises:

A) forming a first melt for a non-voided compliant layer, comprising from about 10 to about 40 weight % at least one elastomeric polymer, B) forming a second melt for an antistatic tie layer comprising a thermoplastic antistatic polymer, C) forming a third melt for an image receiving layer, and D) co-extruding the three melts to form a composite film.

This method may further comprise:

E) stretching the composite film to reduce its thickness, and

F) applying the stretched composite film to a support.

The third melt can be used to provide a dye-receiving layer.

The present invention includes several advantages, not all of which are incorporated in a single embodiment. The non-voided compliant layer may be co-extruded with the antistatic tie layer eliminating the need for an additional manufacturing step. Additionally, the dye receiving layer may be co-extruded with the antistatic tie layer and non-voided compliant layer. The non-voided compliant layer used in this invention provides enhanced adhesion, especially in situations where adhesion between the various layers is humidity sensitive, thereby reducing delamination, especially around perforations, and other cut, slit, or perforated edges. The non-voided compliant layer is particularly useful on substrates containing cellulosic materials such as raw paper stock.

DETAILED DESCRIPTION OF THE INVENTION

Definitions

Unless otherwise indicated, the terms "extruded imaging element", "imaging element", "thermal dye receiver element", and "receiver element" refer to embodiments useful in the present invention.

The present invention relates to a method of making a multilayer film that is useful as an thermal dye receiver element. This film includes a dye receiving layer (DRL), an extruded compliant layer, and an extruded antistatic tie layer between the extruded compliant layer and the DRL. One or more extruded skin layers can be located immediately adjacent on either or both surfaces of the extruded compliant layer. This multilayer film can be applied to a suitable support (described below).

As used herein, the term "extruded imaging element" comprises the various layers described herein including a non-voided compliant layer and at least one dye receiving layer and can be used in multiple techniques governing the thermal transfer of an image onto the imaging element. Such elements then comprise at least one thermal dye receiving layer. The dye receiver elements may be desired for reflection viewing, that is having an opaque support, or desired for viewing by transmitted light, that is having a transparent support.

The terms as used herein, "top", "upper", and "face" mean the side or toward the side of an image receiving layer (IRL) such the side bearing the DRL.

The terms "bottom", "lower side", and "back" mean the side or toward the side of the dye receiver element opposite from the side bearing an image receiving layer (IRL) such as a DRL.

The term "non-voided" as used to refer to the extruded compliant layer as being devoid of added solid or liquid matter or voids containing a gas.

The term "voided polymers" will include materials comprising microvoided polymers and microporous materials known in the art. A foam or polymer foam formed by means of a blowing agent is not considered a voided polymer for purposes of the present invention.

Compliant Layer

The compliant layer present in the extruded imaging element is provided by extruding one or more elastomeric polymers such as a thermoplastic polyolefin blend, styrene/alkylene block copolymer, polyether block polyamide, copolyester elastomer, or thermoplastic urethane. Generally, the compliant layer comprises multiple resins, at least some or which are elastomeric including but not limited to, thermoplastic elastomers like polyolefin blends, styrene block copolymers (SBC) like styrene-ethylene/butylene-styrene (SEBS) or styrene-ethylene/propylene styrene (SEPS) or styrene butadiene styrene (SBS) or styrene isoprene styrene (SIS), polyether block polyamide (Pebax® type polymers), thermoplastic copolyester elastomer (COPE), thermoplastic urethanes (TPU), and semicrystalline polyolefin polymers such as ethylene/propylene copolymers (for example, available as Vistamaxx™ polymers) and olefinic block copolymers (OBC) that are highly elastic and compatible with polyolefins. One or more elastomeric resins are present in an amount of from about 10 to about 40 weight %, or typically from about 15 to about 30 weight %.

The compliant layer generally also includes one or more "matrix" polymers that are not generally elastomeric. Such polymeric materials include but are not limited to, polyolefins such as polyethylene, polypropylene, their copolymers, functionalized or grafted polyolefins, polystyrene, polyamides like amorphous polyamide (like Selar), and polyesters. The amount of one or more matrix polymers in the compliant layer is generally from about 35 to about 80 weight % or typically from about 40 to about 65 weight %.

In some embodiments, the compliant layer also includes a third component that is an additive amorphous or semi-crystalline polymer such as copolymers based on cyclic olefins and polyolefin (such as Topas® polymers), polypropylenes, polystyrenes, maleated polyethylene (such as Dupont Bynel® grades, Arkema's Lotader® grades) that can be present in an amount of from about 2 to about 25 weight %, or typically from about 5 to about 20 weight %.

Depending on the manufacturing process and thickness of the extruded compliant layer, the various types of resins are used individually or in mixtures or blends. For example, useful compliant layer resin blends include blends of ethylene/ethyl acrylate copolymers (EEA), ethylene/butyl acrylate copolymers (EBA), or ethylene/methyl acrylate copolymers (EMA) with styrene block copolymers such as SEBS an example of which is Kraton® G1657M; EEA, EBA, or EMA with SEBS and polypropylene; EEA, EBA, or EMA polymers with SEBS and polystyrene; EEA, EBA, or EMA with SEBS and a copolymer of cyclic olefins and polyolefins (an example of which is Topas); polypropylene with Kraton® polymers like FG1924X, G1702, G1730M; polypropylene or mixture of polypropylenes with ethylene propylene copolymers like Exxon Mobil's Vistamaxx™ grades; or blends of low density polyethylene (LDPE) with amorphous polyamide like Dupont's Selar and Kraton® FG grade of polymers and an additive compound such as maleated polyethylene (Dupont Bynel® grades, Arkema's Lotader® grades).

For example, some embodiments include combinations of polymers in the extruded compliant layer that comprise from about 40 to about 65 weight % of a matrix polymer, from about 10 to about 40 weight % of the elastomeric polymer, and from about 5 to about 20 weight % of an amorphous or semi-crystalline polymer additive. The weight ratio of the three components can be varied and optimized based on the layer structure and the resins used.

The resin compositions in the extruded compliant layer are optimized for printer performance as well as ability to manufacture at high speeds using a high temperature process like extrusion coating or cast extrusion. Higher than room temperature extrusion requires the resins to have thermal stability, must have the ability to be drawn down, have the appropriate shear viscosity and melt strength, and must have good release from a chill roll, casting wheel, or cooling roll stack. The shear viscosity range of the compliant layer resins and resin blends should be from about 1,000 poise to about 100,000 poise at 200° C. at a shear rate of 1 $s^{-1}$, or from about 2,000 poise to about 50,000 poise at 200° C. at a shear rate of 1 $s^{-1}$.

The dry final thickness of the extruded compliant layer is generally from about 15 to about 70 μm or typically from about 20 to about 45 μm.

The compliant layer resin formulation is applied using high temperature extrusion processes like cast extrusion or extrusion coating or hot melt at a temperature of from about 200 to about 285° C. at an extrusion speed of from about 0.0508 m/sec to about 5.08 m/sec. Useful extrusion speeds are high speeds due to productivity constraints and for economical reasons. In some instances, the resulting compliant layer can be extruded at a thickness greater than the final thickness at slow speeds, but then stretched or made thinner by an orientation process that results in coating on a support at a higher speed. A less desirable variation of the orientation process is biaxial orientation of the extruded compliant layer and laminating it to a support.

As described in more detail below, the compliant layer is formed by co-extrusion with one or more other extruded layers in the imaging element.

An advantage of high temperature extrusion processes is that the roughness of the topmost surface of the element (image receiving layer) is determined by the chill roll or the casting wheel or the cooling roll stack roughness characteristics and temperature. This can be of a roughness average $R_a$ of less than 2 μm (or typically from about 0.01 to about 1 μm) and an $R_z$ of less than 10 μm (typically from about 0.15 to about 6 μm). On coating the top side of the support with the extruded compliant, extruded antistatic tie, and image receiver layers (as described above) the image receiver element roughness characteristics are lower than the roughness of the top surface of the underlying support. Furthermore, one advantage of making the imaging elements according to this invention is that the process allows the extruded compliant layer to be rough, but upon applying the extruded antistatic tie layer and extruded image receiving layer, typically the resultant roughness of the outermost surface is reduced.

The extruded compliant layer can also include additives such as opacifiers like titanium dioxide, calcium carbonate, colorants, dispersion aids like zinc stearate, chill roll release agents, antioxidants, UV stabilizers, and optical brighteners. If there is a need, the extruded compliant layer can also include an antistatic agent of which there are many known in the art.

Skin Layer(s)

The imaging element can also include one or more skin layers, on either or both sides of the extruded compliant layer. Such skin layers can be composed of polyolefins such as polyethylene, copolymers of ethylene, like ethylene/methyl acrylate (EMA) copolymers, ethylene/butyl acrylate (EBA) copolymers, ethylene/ethyl acrylate (EEA) copolymers, ethylene/methyl acrylate/maleic anhydride copolymers, or blends of these polymers. The acrylate content in the skin should be so adjusted that it does not block in roll form, or antiblock additives can be added to the layer formulation. Different skin layers can be used on opposite sides of the extruded compliant layer. Elastomers (as described above for the extruded compliant layer) can be present in the skin layers if desired.

The thickness of the image side skin layer can be from up to 10 μm, and typically up to 8 μm. The resin choice and the overall composition of the topmost surface of the support is optimized to obtain good adhesion to extruded antistatic tie layer and enable good chill roll or casting wheel release.

A skin layer on the support side of the extruded compliant layer can be similarly composed and have a thickness of up to 70 μm, and typically up to 15 μm.

The skin layers can be extruded individually at high temperatures of from about 200 to about 285° C. at speeds of from about 0.0508 m/sec to about 5.08 m/sec. Alternatively, they can be co-extruded (extruded simultaneously) with the compliant layer and cast on a chill roll, casting wheel, or cooling stack.

Antistatic Tie Layer

The extruded imaging element also includes an extruded antistatic tie layer whose composition is humidity insensitive, and that provides enhanced adhesion to the image receiving layer and desired antistatic properties to the overall imaging element and assemblage. The antistatic tie layer may be any suitable melt extrudable material that does not have a harmful effect upon the element. Considerable details of these layers are provided in U.S. Pat. Nos. 6,897,183 (Arrington et al.) and 7,521,173 (Dontula et al.) and U.S. Patent Application Publication 2004/0167020 (Arrington et al.), all of which disclosures are incorporated herein by reference. Useful polymers used to form a matrix for these layers are disclosed for example in U.S. Pat. Nos. 6,197,486, 6,207,361, 6,436,619, 6,465,140, and 6,566,033 and all incorporated herein by reference.

The extruded antistatic tie layer also contains an antistatic material that is usually humidity insensitive. The amount of antistatic material contained in this layer is such that it provides the required static protection while absorbing/taking up/picking up less than 3 weight % (typically less than 2 weight %) of the extruded antistatic layer weight as moisture at 80% RH and 22.78° C. (73° F.). U.S. Pat. No. 7,521,173 (noted above) provides considerable details about such antistatic materials. The constraint in moisture pickup enables printing across multiple printer platforms (or equipment) in harsh environments (temperature and humidity).

Useful antistatic polymers are block copolymers of polyethylene oxide (polyether) segments with a polypropylene and/or polyethylene (polyolefin) segments. In one embodiment, the block polymer has a number average molecular weight of from about 2,000 to about 200,000 as determined by gel permeation chromatography. The polyolefin of the block polymer may have carbonyl groups at both polymer termini or a carbonyl group at one polymer terminus. In other embodiments, the antistatic polymers comprising polyamide block(s) and polyether block(s), they are typically prepared using copolycondensation of polyamide sequences containing reactive ends with polyether sequences containing reactive ends, such as, inter alia: 1) polyamide sequences containing diamine chain ends with polyoxyalkylene sequences containing dicarboxyl chain ends, 2) polyamide sequences containing dicarboxyl chain ends with polyoxyalkylene sequences containing diamine chain ends obtained by cyanoethylation and hydrogenation of alpha, omega-dihydroxylated aliphatic polyoxyalkylene sequences known as polyetherdiols, 3) polyamide sequences containing dicarboxyl chain ends with polyetherdiols, the products obtained being, in this specific case, polyetheresteramides.

The final thickness of the extruded antistatic tie layer is generally from about 0.5 to about 10 μm, and typically from about 0.75 μm to about 5 μm.

The antistatic tie layer can be extruded at high temperature similarly to the compliant layer, and in many embodiments, the two layers are extruded simultaneously (co-extruded) although the extrusion speed can be the same or different for the two layers. In some embodiments, the two layers may be coextruded with the image receiving layer or the antistatic tie layer may be coextruded with the image receiving layer. In some other embodiments, all the layers, specifically compliant layer with or without skin layer, antistatic tie layer and image receiving layer are coextruded onto the support.

The adhesion of the antistatic tie layer may be further enhanced using an infrared (IR) heat treatment, where the image receiving layer or dye receiving layer (DRL) surface is exposed to IR heat during manufacturing or finishing. The improvement in adhesion after IR heat is dependent on surface temperature and time spent under IR heat. The optimum surface temperature of the DRL needs to be between 93°-109° C. (200-228° F.). The time spent under IR heat is a function of line speeds of the manufacturing or the finishing operation and should be around 1 second.

Image Receiving Layer

The image receiving layer used in the imaging element may be formed in any suitable manner, for example using solvent or aqueous coating techniques as described in U.S. Pat. Nos. 5,411,931, 5,266,551, 6,096,685, 6,291,396, 5,529,972, and 7,485,402 that are incorporated herein by reference.

In most embodiments, the image receiving layer (such as a thermal dye image receiving layer) is extruded on to the antistatic tie layer, or the two layers are extruded simultaneously (co-extruded). The details of such image receiving layers are provided for example in U.S. Pat. No. 7,091,157 (Kung et al.) that is incorporated herein by reference. For example, such layers may comprise, for example, a polycarbonate, a polyurethane, a polyester, polyvinyl chloride, poly(styrene-co-acrylonitrile), poly(caprolactone), or mixtures thereof. An overcoat layer may be further coated over the image receiving layer, such as described for example, in U.S. Pat. No. 4,775,657 (Harrison et al.).

The image receiver layer generally is extruded at a thickness of at least 100 μm and typically from about 100 to about 800 μm, and then uniaxially stretched to less than 10 μm. The final thickness of the image receiving layer is generally from about 1 to about 10 μm, and typically from about 1 μm to about 5 μm with the optimal thickness being determined for the intended purpose.

It may be sometimes desirable for the image receiving layer (such as a thermal dye image receiving layer) to also comprise other additives such as lubricants that can enable improved conveyance through a printer. An example of a lubricant is a polydimethylsiloxane-containing copolymer such as a polycarbonate random terpolymer of bisphenol A, diethylene glycol, and polydimethylsiloxane block unit and may be present in an amount of from 2% to 30% by weight of the image receiving layer. Other additives that may be plasticizers such as esters or polyesters formed from a mixture of 1,3-butylene glycol adipate and dioctyl sebacate. The plasticizer would typically be present in an amount of from about 2% to about 20% by total weight of the dye image receiving layer.

Preparation of Various Layers in Element

According to one embodiment of the invention, the antistatic tie layer and the outer layer (image receiving layer or thermal dye-receiving layer) are coextruded as described below, onto a separately extruded compliant layer (with or without one or more extruded skin layers). In a first step, a first melt and a second melt are formed, the first melt of one or more polymers useful in the outer layer (or thermal dye image receiving layer) and the second melt comprising a useful thermoplastic polymer blend having desirable antistatic, adhesive, viscoelastic properties, generally having not more than 10 times or 1/10, or not more than 3 times or less than 1/3 difference in viscosity from that of the first melt that forms the image receiving layer), thereby promoting efficient and high quality coextrusion. The antistatic tie layer, and its melt, such as a polymeric binder or matrix resin for the antistatic polymer and components are adjusted to obtain the desired viscoelastic properties (while maintaining desired product requirements), so that when it is extruded, the film does not extend beyond the edges of the co-extruded film from the melt for the image-receiving layer, resulting in unmatched films. In such an event, a portion of an unmatched extruded film may be trimmed off. However, this reduces, although not eliminating, the favorable economics for extrusion versus solvent coating.

Unmatched edges between coextruded layers or films may tend to occur when the viscosity ratio between coextruded melts is about 10:1. In a second step, the two melts are coextruded using a coextrusion feedblock or a multi-manifold die technology. In a third step, the coextruded layers or laminate can be stretched to reduce the thickness. In a fourth step, the extruded and stretched laminate is applied to an extruded compliant layer described above while simultaneously reducing the temperature within the range below the glass transition temperature ($T_g$) of the image receiving layer, for example, by quenching between two nip rollers. The ratio of thickness of the extruded antistatic tie layer to the extruded image receiving layer (IRL) after coating and quenching on the extruded compliant layer is typically 1:1 to 1:10, or typically 1:2 to 1:5.

According some embodiments of the invention, a skin layer may be formed on either side of the extruded compliant layer or on both sides of the extruded compliant layer. These skin layers may be individually extruded on to the support described below by any of the extrusion methods like extrusion coating or cast extrusion or hot melt extrusion. In these methods, the polymer or resin blend is melted in the first step. In a second step, the melt is homogenized to reduce temperature excursions or adjusted and delivered to the die. In a third step, the skin layer is delivered onto a support or a modified support and rapidly quenched below its transition temperature (melting point or glass transition) so as to attain rigidity. For the skin layer closer to the support, the resin is delivered onto the support while the skin layer closer to the image receiving layer it is delivered onto the compliant layer that has been coated on a support (this is known as modified support).

Instead of laying down the skin layer(s) individually that would require multiple stations or multiple operations, a useful method of laying down the skin layer(s) is simultaneously with the compliant layer. This is typically known as multilayer co-extrusion. In this method, two or more polymers or resin formulations are extruded and joined together in a feedblock or die to form a single structure with multiple layers. Typically, two basic die types are used for co-extrusion: multi-manifold dies and feedblock with a single manifold die although hybrid versions exist that combine feedblocks with multi-manifold die. In the case of a multi-manifold die, the die has individual manifolds that extend across its full width. Each of the manifolds distributes the polymer layer uniformly. The combination of the layers (in this case skin(s) with compliant layer) might occur inside the die before the final die land or outside the die. In the case of the feedblock method, the feedblock arranges the melt stream in the desired layer structure prior to the die inlet. A modular feedblock design along with the extruder flow rates enables the control of sequence and thickness distribution of the layers.

Overall in a first step for creating the skin layer(s), the polymer or resin blend composition is melted and delivered to the co-extrusion configuration. Similarly for the compliant layer, the resin blend composition is melted and delivered to the co-extrusion configuration. To enable good spreading and layer uniformity, the skin layer viscosity characteristics should not be more than 10 times or 1/10, or not more than 3 times or less than 1/3 difference in viscosity from that of the melt that forms the compliant layer. This promotes efficient and high quality coextrusion and avoids nonuniform layers. Layer uniformity can be adjusted by varying melt temperature. To enable good interlayer adhesion, material composition can be optimized, layer thickness can be varied, and also the melt temperature of the streams adjusted in the coextrusion configuration.

In a third step of creating a coextruded structure of skin layer(s) with a compliant layer, the coextruded layers or laminate can be stretched or oriented to reduce the thickness. In a fourth step, the extruded and stretched laminate is applied to an the support described below while simultaneously reducing the temperature within the range below the melting temperature ($T_m$) or glass transition temperature ($T_g$) of the skin layer(s), for example, by quenching on a casting wheel, chill roll, or between two nip rollers that may have the same or different finish such as matte, rough glossy, or mirror finish. The characteristics of the various finishes are described in TABLE 1 below.

This invention enables the use of thermal compositions for compliant layers having various surface roughness characteristics while controlling the surface roughness characteristics of the outermost image receiving layer.

In other embodiments, the antistatic tie layer and the compliant layer (described above) can be co-extruded and the image receiving layer can be applied (extruded or solvent or aqueous coated) separately onto the extruded antistatic tie layer. When the image receiving layer is solvent or aqueous coated it may be crosslinked during the coating or drying operation or crosslinked later by an external means like UV irradiation.

In still other embodiments, all three of the image receiving layer, antistatic tie layer, and compliant layer are co-extruded using a similar process as described above for co-extrusion of two layers.

In addition, the skin layers can be extruded separately (as noted above), or co-extruded with one or more of the other layers.

Element Structure and Supports

The particular structure of an imaging element (for example, a thermal dye receiver element) formed by the present invention can vary, but it is generally a multilayer structure comprising, under the image receiving layer, extruded antistatic tie layer, and extruded compliant layer, a support (defined as all layers below the extruded compliant layer) that comprises a base support, such as a cellulose paper comprising cellulose paper fibers, a synthetic paper comprising synthetic polymer fibers, or a resin coated paper. But other base supports such as fabrics and polymer sheets can be used. The base support may be any support typically used in imaging applications. Any of the imaging elements of this invention could further be laminated to a substrate or support to increase the utility of the extruded imaging element.

The resins used on the bottom or wire side (backside) of the paper base are thermoplastics like polyolefins such as polyethylene, polypropylene, copolymers of these resins, or blends of these resins. Other useful polymers include poly(styrene-co-butadiene), poly(styrene-co-acrylates), poly(vinyl butyral), and poly(vinyl chloride-co-vinyl acetate). The thickness of the resin layer on the bottom side of the raw base can range from about 5 μm to about 75 μm, and typically from about 10 μm to about 40 μm. The thickness and resin composition of the resin layer can be adjusted to provide desired curl characteristics. The surface roughness of this resin layer can be adjusted to provide desired conveyance properties during manufacturing and in imaging printers.

The base support may be transparent or opaque, reflective or non-reflective. Opaque supports include plain paper, coated paper, resin-coated paper such as polyolefin-coated paper, synthetic paper, low density foam core based support, and low density foam core based paper, photographic paper support, melt-extrusion-coated paper, and polyolefin-laminated paper.

The papers include a broad range of papers, from high end papers, such as photographic paper to low end papers, such as newsprint. In one embodiment, Ektacolor® paper made by Eastman Kodak Co. as described in U.S. Pat. Nos. 5,288,690 and 5,250,496, both incorporated herein by reference, may be employed. The paper may be made on a standard continuous fourdrinier wire machine or on other modern paper formers. Any pulps known in the art to provide paper may be used. Bleached hardwood chemical kraft pulp is useful as it provides brightness, a smooth starting surface, and good formation while maintaining strength. Papers useful in this invention are of caliper from about 50 μm to about 230 μm, typically from about 100 μm to about 190 μm, because then the overall imaged element thickness is in the range desired by customers and for processing in existing equipment. They may be "smooth" so as to not interfere with the viewing of images. Chemical additives to impart hydrophobicity (sizing), wet strength, and dry strength may be used as needed. Inorganic filler materials such as $TiO_2$, talc, mica, $BaSO_4$ and $CaCO_3$ clays may be used to enhance optical properties and reduce cost as needed. Dyes, biocides, and processing chemicals may also be used as needed. The paper may also be subject to smoothing operations such as dry or wet calendering, as well as to coating through an in-line or an off-line paper coater.

A particularly useful support is a paper base that is coated with a resin on either side. Biaxially oriented base supports include a paper base and a biaxially oriented polyolefin sheet, typically polypropylene, laminated to one or both sides of the paper base. Commercially available oriented and unoriented polymer films, such as opaque biaxially oriented polypropylene or polyester, may also be used. Such supports may contain pigments, air voids or foam voids to enhance their opacity. The base support may also consist of microporous materials such as polyethylene polymer-containing material sold by PPG Industries, Inc., Pittsburgh, Pa. under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861 that is incorporated herein by reference. Microvoided composite biaxially oriented sheets may be utilized and are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616, 4,758,462, and 4,632,869, the disclosures of which are incorporated by reference.

"Void" is used herein to mean devoid of added solid and liquid matter, although it is likely the "voids" contain gas. The void-initiating particles, which remain in the finished packaging sheet core, should be from about 0.1 to about 10 μm in diameter and typically round in shape to produce voids of the desired shape and size. The size of the void is also dependent on the degree of orientation in the machine and transverse directions. Ideally, the void would assume a shape that is defined by two opposed, and edge contacting, concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid may traverse.

Biaxially oriented sheets, while described as having at least one layer, may also be provided with additional layers that may serve to change the properties of the biaxially oriented sheet. Such layers might contain tints, antistatic or conductive materials, or slip agents to produce sheets of unique properties. Biaxially oriented sheets may be formed with surface layers, referred to herein as skin layers, which would provide an improved adhesion, or look to the support and photographic element. The biaxially oriented extrusion may be carried out with as many as 10 layers if desired to achieve some particular desired property. The biaxially oriented sheet may be made with layers of the same polymeric material, or it may be made with layers of different polymeric composition. For compatibility, an auxiliary layer may be used to promote adhesion of multiple layers.

Transparent supports include glass, cellulose derivatives, such as a cellulose ester, cellulose triacetate, cellulose diacetate, cellulose acetate propionate, cellulose acetate butyrate, polyesters, such as poly(ethylene terephthalate), poly(ethylene naphthalate), poly-1,4-cyclohexanedimethylene terephthalate, poly(butylene terephthalate), and copolymers thereof, polyimides, polyamides, polycarbonates, polystyrene, polyolefins, such as polyethylene or polypropylene, polysulfones, polyacrylates, polyether imides, and mixtures thereof. The term as used herein, "transparent" means the ability to pass visible radiation without significant deviation or absorption.

The imaging element support used in the invention may have a thickness of from about 50 to about 500 μm, or typically from about 75 to about 350 μm. Antioxidants, brightening agents, antistatic or conductive agents, plasticizers and other known additives may be incorporated into the support, if desired. In one embodiment, the element has an L*UVO (UV out) of greater than 80 and a b*UVO of from 0 to −6.0. L*, a* and b* are CIE parameters (see, for example, Appendix A in Digital Color Management by Giorgianni and Madden, published by Addison, Wesley, Longman Inc., 1997) that can be measured using a Hunter Spectrophotometer using the D65 procedure. UV out (UVO) refers to use of UV filter during characterization such that there is no effect of UV light excitation of the sample.

In another embodiment, the base support comprises a synthetic paper that is typically cellulose-free, having a polymer core that has adhered thereto at least one flange layer. The polymer core comprises a homopolymer such as a polyolefin, polystyrene, polyester, polyvinylchloride, or other typical thermoplastic polymers; their copolymers or their blends thereof, or other polymeric systems like polyurethanes, polyisocyanurates. These materials may or may not have been expanded either through stretching resulting in voids or through the use of a blowing agent to consist of two phases, a solid polymer matrix, and a gaseous phase. Other solid phases may be present in the form of fillers that are of organic (polymeric, fibrous) or inorganic (glass, ceramic, metal) origin. The fillers may be used for physical, optical (lightness, whiteness, and opacity), chemical, or processing property enhancements of the core.

In still another embodiment, the support comprises a synthetic paper that may be cellulose-free, having a foamed polymer core or a foamed polymer core that has adhered thereto at least one flange layer. The polymers described for use in a polymer core may also be employed in manufacture of the foamed polymer core layer, carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents generating gases such as nitrogen or carbon dioxide by the application of heat or through exothermic heat of reaction during polymerization. Physical methods include such techniques as the expansion of a gas dissolved in a polymer mass upon reduction of system pressure; the volatilization of low-boiling liquids such as fluorocarbons or methylene chloride, or the incorporation of hollow microspheres in a polymer matrix. The choice of foaming technique is dictated by desired foam density reduction, desired properties, and manufacturing process. The foamed polymer core can comprise a polymer expanded through the use of a blowing agent.

In a many embodiments, polyolefins such as polyethylene and polypropylene, their blends and their copolymers are used as the matrix polymer in the foamed polymer core along with a chemical blowing agent such as sodium bicarbonate and its mixture with citric acid, organic acid salts, azodicarbonamide, azobisformamide, azobisisobutyrolnitrile, diazoaminobenzene, 4,4'-oxybis(benzene sulfonyl hydrazide) (OBSH), N,N'-dinitrosopentamethyltetramine (DNPA), sodium borohydride, and other blowing agent agents well known in the art. Useful chemical blowing agents would be sodium bicarbonate/citric acid mixtures, azodicarbonamide; though others may also be used. These foaming agents may be used together with an auxiliary foaming agent, nucleating agent, and a cross-linking agent.

One embodiment of the invention provides a thermal dye receiving element for thermal dye transfer comprising a base support and on one side thereof an extruded compliant layer, extruded antistatic tie layer, and an extruded thermal dye image receiving layer, and optionally one or more skin layers on either or both sides of the extruded compliant layer.

This invention can also provides image receiver elements that are "dual-sided", meaning that they have an image receiving layer (such as a thermal dye receiving layer) on both sides of the support. In such embodiments, there may be an extruded compliant layer, an extruded antistatic tie layer, and optional skin layers, under an image receiving layer on both sides of the support. Thus, some embodiments provide the same arrangement of layers (for example, image receiving layer, extruded antistatic tie layer, and extruded compliant layer) on each side of the support. Such "dual-sided" image receiver elements can be used in duplex printing to create pages for a photo-book that has imaged on both sides of the sheets.

Dye Donors Elements

Ink or thermal dye-donor elements that may be used with the extruded imaging element generally comprise a support having thereon an ink or dye containing layer.

Any ink or dye may be used in the thermal ink or dye-donor provided that it is transferable to the thermal ink or dye-receiving or recording layer by the action of heat. Ink or dye donor elements are described, for example, in U.S. Pat. Nos. 4,916,112; 4,927,803; and 5,023,228 that are all incorporated herein by reference. As noted above, ink or dye-donor elements may be used to form an ink or dye transfer image. Such a process comprises image-wise-heating an ink or dye-donor element and transferring an ink or dye image to an ink or dye-receiving or recording element as described above to form the ink or dye transfer image. The thermal ink or dye transfer method of printing, an ink or dye donor element may be employed that comprises a poly(ethylene terephthalate) support coated with sequential repeating areas of cyan, magenta, or yellow ink or dye, and the ink or dye transfer steps may be sequentially performed for each color to obtain a multi-color ink or dye transfer image. The support may also include a clear protective layer that can be transferred onto the transferred dye images. When the process is performed using only a single color, then a monochrome ink or dye transfer image may be obtained.

Dye-donor elements that may be used with the dye-receiving element conventionally comprise a support having thereon a dye containing layer. Any dye can be used in the dye layer of the dye-donor element provided it is transferable to the dye-receiving layer by the action of heat. Especially good results have been obtained with sublimable dyes, such as the magenta dyes described in U.S. Pat. No. 7,160,664 (Goswami et al.) that is incorporated herein by reference.

The dye-donor layer can include a single color patch or area, or multiple colored areas (patches) containing dyes suitable for thermal printing. As used herein, a "dye" can be one or more dye, pigment, colorant, or a combination thereof, and can optionally be in a binder or carrier as known to practitioners in the art. For example, the dye layer can include a magenta dye combination and further comprise a yellow dye-donor patch comprising at least one bis-pyrazolone-methine dye and at least one other pyrazolone-methine dye, and a cyan dye-donor patch comprising at least one indoaniline cyan dye.

Any dye transferable by heat can be used in the dye-donor layer of the dye-donor element. The dye can be selected by taking into consideration hue, lightfastness, and solubility of the dye in the dye donor layer binder and the dye image receiving layer binder.

Further examples of useful dyes can be found in U.S. Pat. Nos. 4,541,830; 4,698,651; 4,695,287; 4,701,439; 4,757,046; 4,743,582; 4,769,360; 4,753,922; 4,910,187; 5,026,677; 5,101,035; 5,142,089; 5,374,601; 5,476,943; 5,532,202; 5,804,531; 6,265,345, 7,501,382 (Foster et al.), and U.S. Patent Application Publications 2003/0181331 and 2008/0254383 (Soejima et al.), the disclosures of which are hereby incorporated by reference.

The dyes can be employed singly or in combination to obtain a monochrome dye-donor layer or a black dye-donor layer. The dyes can be used in an amount of from about 0.05 $g/m^2$ to about 1 $g/m^2$ of coverage. According to various embodiments, the dyes can be hydrophobic.

Imaging and Assemblies

As noted above, dye-donor elements and image receiving elements can be used to form a dye transfer image. Such a process comprises imagewise-heating a thermal dye donor element and transferring a dye image to a thermal dye receiver element as described above to form the dye transfer image.

A thermal dye donor element may be employed which comprises a poly(ethylene terephthalate) support coated with sequential repeating areas of cyan, magenta and yellow dye, and the dye transfer steps are sequentially performed for each color to obtain a three-color dye transfer image. The dye donor element may also contain a colorless area that may be transferred to the image receiving element to provide a protective overcoat.

Thermal printing heads which may be used to transfer ink or dye from ink or dye-donor elements to an image receiver element may be available commercially. There may be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal ink or dye transfer may be used, such as lasers as described in, for example, GB Publication 2,083,726A that is incorporated herein by reference.

A thermal transfer assemblage may comprise (a) an ink or dye-donor element, and (b) an ink or dye image receiver element, the ink or dye image receiver element being in a superposed relationship with the ink or dye donor element so that the ink or dye layer of the donor element may be in contact with the ink or thermal dye image receiving layer. Imaging can be obtained with this assembly using known processes.

When a three-color image is to be obtained, the above assemblage may be formed on three occasions during the time when heat may be applied by the thermal printing head. After the first dye is transferred, the elements may be peeled apart. A second dye donor element (or another area of the donor element with a different dye area) may be then brought in register with the thermal dye receiving layer and the process repeated. The third color may be obtained in the same manner.

The following embodiments are representative of those included within the present invention:

Embodiment 1

A method of making a thermal imaging element comprises:

providing a support;

applying to the support, in order:

a non-voided compliant layer that comprises from about 10 to about 40 weight % of at least one elastomeric polymer, an antistatic tie layer, and an image receiving layer, wherein all three of the non-voided compliant layer, antistatic tie layer, and image receiving layer are extruded onto the support, and at least two of the layers are co-extruded.

Embodiment 2

The method of embodiment 1 wherein all three of the non-voided compliant layer, antistatic tie layer, and image receiving layer are co-extruded onto the support.

Embodiment 3

The method of embodiment 1 or 2 wherein the support comprises cellulose paper fibers.

Embodiment 4

The method of claim 3 wherein the extruded support is laminated to a biaxially oriented polypropylene (BOPP) on the side of the paper raw base opposite to the compliant layer.

Embodiment 5

The method of any of embodiments 1 to 4 wherein the extruded antistatic tie layer absorbs less than 3 weight % of moisture at 80% RH and 22.78° C. and comprises from about 5 to about 30% of a polyether-containing antistatic material in a matrix polymer.

Embodiment 6

The method of any of embodiments 1 to 5 wherein the elastomeric polymer is present in the extruded compliant layer in an amount of from about 15 to about 30 weight %.

Embodiment 7

The method of any of embodiments 1 to 6 wherein the elastomeric polymer comprises at least one of a thermoplastic polyolefin blend, styrene/alkylene block copolymer, olefinic block copolymer, polyether block polyamide, copolyester elastomer, polyethylene/propylene copolymer, or thermoplastic urethane.

Embodiment 8

The method of any of embodiments 1 to 7 wherein the extruded compliant layer comprises from about 35 to about 80 weight % of a matrix polymer, from about 10 to about 40 weight % of the elastomeric polymer, and from about 2 to about 25 weight % of an amorphous or semi-crystalline polymer additive.

Embodiment 9

The method of embodiment 8 wherein the polymer additive is a polypropylene, polystyrene, copolymer of cyclic olefin and polyolefin, or maleated polyethylene.

Embodiment 10

The method of any of embodiments 1 to 9 further comprising extruding a skin layer immediately adjacent either or both sides of the extruded compliant layer.

Embodiment 11

The method of embodiment 10 comprising co-extruding the skin layer(s) and the compliant layer.

Embodiment 12

The method of any of embodiments 1 to 11 wherein the compliant layer is extruded as a formulation having a shear viscosity of from about 1000 to about 100,000 poise at 200° C. and a shear rate of 1 $s^{-1}$.

Embodiment 13

The method of any of embodiments 1 to 12 wherein the image receiving layer, extruded antistatic tie layer, extruded compliant layer, and optional extruded skin layer(s) are extruded onto a support.

Embodiment 14

The method of any of embodiments 1 to 13 wherein the compliant layer is extruded to a thickness of from about 15 to about 70 μm, the antistatic tie layer is extruded to a thickness of from about 0.5 to about 10 μm, and the image receiving layer is extruded to a thickness of from about 100 to about 800 μm.

Embodiment 15

The method of any of embodiments 1 to 14 wherein the image receiving layer further comprises a release agent.

Embodiment 16

A method of forming a thermal imaging element comprising:

A) forming a first melt for a non-voided compliant layer, comprising from about 10 to about 40 weight % at least one elastomeric polymer, B) forming a second melt for an antistatic tie layer comprising a thermoplastic antistatic polymer, C) forming a third melt for an image receiving layer, and D) co-extruding said three melts to form a composite film.

Embodiment 17

The method of embodiment 16 further comprising:

E) stretching the composite film to reduce its thickness, and

F) applying the stretched composite film to a support.

Embodiment 18

The method of embodiment 16 or 17 wherein the first melt comprises at least one of a thermoplastic polyolefin blend, styrene/alkylene block copolymer, polyether block polyamide, copolyester elastomer, ethylene/propylene copolymer, thermoplastic urethane, ethylene propylene copolymer, olefinic block copolymer, or a mixture thereof, the second melt comprises an antistatic polymer that is a polyether-block copolyamide, polyetheresteramide, segmented polyether urethane, or polyether-block-polyolefin, and the third melt comprises a polymer that is a polyester, polycarbonate, copolymer of a cyclic olefin and polyolefin, maleated polyethylene, or mixture of any two or more of these.

Embodiment 19

The method of any of embodiments 16 to 18 wherein the third melt provides a dye-receiving layer.

The following examples are provided to illustrate the invention. In all the examples the support was created as follows.

EXAMPLES

The control support, CS-1, consists of a photographic paper raw base core that is 137.16 μm thick and is laminated on both the image receiving side and the opposite side. The laminate on the image receiving side was a commercially available packaging film OPPalyte® K18 TWK made by ExxonMobil. OPPalyte® K18 TWK is a composite film (37 μm thick) (specific gravity 0.62) consisting of a microvoided and oriented polypropylene core (approximately 73% of the total film thickness), with a titanium dioxide pigmented non-microvoided oriented polypropylene layer on each side; the void-initiating material is poly(butylene terephthalate). Reference is made to U.S. Pat. No. 5,244,861 where details for the production of this laminate are described at Col. 3, line 24 to Col. 6, line 62, which is incorporated herein by reference. The laminate on the opposite side of the support was a commercially available oriented polypropylene film Bicor® 70 MLT made by ExxonMobil. Bicor® 70MLT (18 μm thick) (specific gravity 0.9) that has a matte finish on one side and a treated polypropylene film comprising a non-microvoided polypropylene core on the other side. The additional layers were coated on the laminate (OPPalyte® K18 TWK) surface on the image receiving side after corona discharge treatment.

Comparative and Invention Examples with extruded compliant layers in place of the packaging film were prepared by applying the experimental, face-side coatings to a paper base. The backside Bicor® laminate film was replaced with a backside coating of non-pigmented polyethylene that consisted of high density polyethylene/low density polyethylene (HDPE/LDPE blend at a 50/50 ratio). The HDPE resin used was an 8 melt flow rate (ASTM D1238) Chevron Phillips PE9608 (density is 962 kg/$m^3$) and the LDPE resin used was a LDPE 5004I (Dow Chemical Co.) that has a density is 924 kg/$m^3$ and 4.15 melt flow rate (ASTM D1238). The resin coverage was approximately 14 g/$m^2$.

A 0.0635 meter single screw extruder was used along with a 0.0254 m single screw extruder to create the compliant layer structures. All the compliant layers were extruded onto the imaging side of the paper at 75.76 m/min. For some structures, the compliant layer was extruded as a monolayer, and for other structures, a coextruded format was used to produce a bi-layer structure, for example, an extruded compliant layer and an extruded skin layer. To create these structures, appropriate feedplug configurations were used. Furthermore, to highlight the effect of materials chosen for compliant layers, and the interaction with extruded tie layer, and to observe the effect on print roughness and printability, experiments were done using different chill rolls. Chill rolls quench the melt curtain in the nip between the chill roll and the support.

Chill rolls used in resin-coating of paper rolls for silver halide supports differ in roughness according to whether a glossy or matte finish is desired in the final print. The roughness is characterized by the standard surface roughness parameters $R_a$, $R_z$ and Rmax. Of the chill rolls used in these experiments, chill roll A had the highest $R_a$, $R_z$, and Rmax. Chill roll C had the lowest $R_a$, $R_z$, and Rmax and is known in the trade as a smooth glossy chill roll. Chill rolls A and B were rougher than Chill roll C and resulted in resin coated products having different gloss and texture or topography due to the increased surface roughness. The characteristics of the chill roll surfaces were measured using a Mahr Perthometer Concept stylus profilometer and are shown in the following TABLE 1. Layer surface thickness can be measured in the same manner.

TABLE 1

| Chill Roll | Ra (μm) | Rz (μm) | Rmax (μm) |
|---|---|---|---|
| A (matte) | 1.143 | 7.976 | 9.618 |
| B (glossy) | 0.132 | 1.174 | 1.323 |
| C (mirror or smooth glossy) | <0.025 | — | <0.305 |

The various supports made up of either the packaging film (control) or providing extruded compliant layers (Invention Examples) were coated with a dye receiver layer by extrusion. This was adhered to the uppermost surface of the image side of support using an antistatic tie layer that was coextruded with the dye receiver layer (DRL). Components of the dye receiver layer and the antistatic tie layer were compounded into pelletized form as described later.

The dye receiver pellets were introduced into a liquid cooled hopper that fed a 0.063 m single screw extruder from Black Clawson. The dye receiver pellets were melted in the extruder and heated to 265° C. The pressure was then increased through the melt pump, and the DRL melt was pumped through a Cloeren coextrusion feedblock.

The antistatic tie layer pellets were introduced into a liquid cooled hopper of another 0.0254 m single screw extruder. The tie layer pellets were also heated to a temperature determined by the requirements of the composition and then pumped to the Cloeren coextrusion feedblock. For all the variations, the melt exiting the die was adjusted to be around 299° C.

The layers were coextruded through a die with a die gap set around 0.46 mm, and whose width was about 1270 mm, and coated onto the supports. The distance between the die exit and the nip formed by the chill roll and the pressure roll was kept at around 120 mm. The line speed for all the variations was 243.8 m/min and no draw resonance was observed.

The antistatic tie layer was extruded to achieve a 1 μm thickness on the support. It was coextruded with the dye receiver layer (DRL) such that the ratio of DRL thickness to the antistatic tie layer thickness was 2:1. The DRL formulation and antistatic tie layer formulations are described below.

Dye Receiving Layer (DRL):

Polyester E-2 (structure and making of branched polyester described in U.S. Pat. No. 6,897,183, Col. 15, lines 3-32), incorporated herein by reference, and U.S. Pat. No. 7,091,157 (Col. 31, lines 23-51), incorporated herein by reference, was dried in a Novatech desiccant dryer at 43° C. for 24 hours. The dryer was equipped with a secondary heat exchanger so that the temperature did not exceed 43° C. during the time that the desiccant was recharged. The dew point was −40° C.

Lexan® 151 a polycarbonate from GE, Lexan® EXRL1414TNA8A005T polycarbonate from GE, and MB50-315 silicone from Dow Chemical Co. were mixed together at a 0.819:1:0.3 ratio and dried at 120° C. for 2-4 hours at −40° C. dew point.

Dioctyl Sebacate (DOS) was preheated to 83° C. and phosphorous acid was mixed in to make a phosphorous acid concentration of 0.4%. This mixture was maintained at 83° C. and mixed for 1 hour under nitrogen before using.

These materials were then used in the compounding operation. The compounding was done in a Leistritz ZSK 27 extruder with a 30:1 length to diameter ratio. The Lexan® polycarbonates/MB50-315-silicone material was introduced into the compounder first and then melted. The dioctyl sebacate/phosphorous acid solution was added and finally the polyester was added. The final formula was 73.46% polyester, 8.9% Lexan® 151 polycarbonate, 10 wt. % Lexan® EXRL1414TNA8A005T, 3% MB50-315 silicone, 5.33% DOS, and 0.02% phosphorous acid. A vacuum was applied with slightly negative pressure and the melt temperature was 240° C. The melted mixture was then extruded through a strand die, cooled in 32° C. water, and pelletized. The pelletized dye receiver compound was then aged for about 2 weeks.

The dye receiver pellets were then dried before extrusion, at 38° C. for 24 hours in a Novatech dryer described above. The dried material was then conveyed using desiccated air to the extruder.

The various antistatic tie layers were created using melt compounding and coated onto the support.

Tie Layer 1 (TL1):

TL1 was formed by compounding or melt mixing a polyether-polyolefin antistatic material from Sanyo Chemical Co., PELESTAT® 300 and Huntsman P4G2Z-159 polypropylene homopolymer in a 70:30 ratio at about 240° C. Prior to compounding PELESTAT® 300 was dried at 77° C. for 24 hours in Novatech dryers. The polymer was then forced through a strand die into a 20° C. water bath and pelletized. The compounded antistatic tie layer pellets were then dried again at 77° C. for 24 hours in a Novatech dryer and conveyed using dessicated air to the extruder.

Tie Layer 2 (TL2):

TL2 was formed by compounding or melt mixing 20 wt. % of a polyether-polyolefin antistatic material from Sanyo Chemical Co., PELESTAT® 230 with 48 wt. % ethylene ethyl acrylate copolymer Amplify EA102 from Dow Chemical and 32 wt. % ethylene ethyl acrylate copolymer Amplify EA103 from Dow Chemical. Prior to compounding, PELESTAT® 230 was dried at 77° C. for 24 hours in Novatech dryers. The polymer was then forced through a strand die into a 20° C. water bath and pelletized. The compounded antistatic tie layer pellets were then dried again at 43.3° C. for 8 hours in a Novatech dryer and conveyed using dessicated air to the extruder.

Tie Layer 3 (TL3):

TL3 was formed by compounding or melt mixing 20 wt. % of a polyether-polyolefin antistatic material from Sanyo Chemical Co., PELESTAT® 230 with 42 wt. % ethylene ethyl acrylate copolymer Amplify™ EA102 from Dow Chemical, 28 wt. % ethylene ethyl acrylate copolymer Amplify™ EA103 from Dow Chemical and 10 wt. % Profax PDC1292 from Basell Polyolefins. Prior to compounding, PELESTAT® 230 was dried at 77° C. for 24 hours in Novatech dryers. The polymer was then forced through a strand die into a 20° C. water bath and pelletized. The compounded antistatic tie layer pellets were then dried again at 43.3° C. for 8 hours in a Novatech dryer and conveyed using dessicated air to the extruder.

The antistatic tie layer and dye receiver layer melts were co-extruded using the methods described in Examples 1 and 3 of U.S. Patent Application Publication 2004/0167020 (noted above).

Comparative Example 1 (CS-1)

The CS-1 element comprised a packaging film with microvoided core laminate on the image side of the support. The antistatic tie layer used was TL1 that had been melted in the extruder such that it exited the extruder at a temperature of about 232° C. The ratio of the DRL to the antistatic tie layer thickness was 2:1.

Comparative Examples 2-3

For these examples the microvoided laminate was replaced with an extruded layer of non-compliant resins as described in TABLES 2 and 3 below.

Invention Examples 1-15

For these examples, the microvoided laminate was replaced with an extruded layer containing an elastomeric compliant resin with or without skin layers as described in the tables below. TABLE 2 lists the various resins used in the compliant layer, in the skin layer and the antistatic tie layer.

TABLE 2

| Resin I.D. | Source | Resin Type | Resin Characteristics |
|---|---|---|---|
| PELESTAT ® 300 | Sanyo Chemical | Antistatic polymer in tie layer | Polyolefin polyether block copolymer |
| PELESTAT ® 230 | Sanyo Chemical | Antistatic polymer in tie layer | Polyolefin polyether block copolymer |
| Amplify ™ EA102 | Dow Chemical | Matrix polymer for compliant layer (used for tie layer too) | Ethylene ethyl acrylate copolymer, 18.5% ethyl acrylate |
| Amplify ™ EA013 | Dow Chemical | Matrix polymer for compliant layer (used for tie layer too) | Ethylene ethyl acrylate copolymer, 19.5% ethyl acrylate |
| Elvaloy ® 1609AC | DuPont | Matrix polymer for compliant layer | Ethylene methyl acrylate copolymer, 9% methyl acrylate |
| P9H8M015PP | Huntsman | Matrix polymer for compliant layer | Polypropylene |
| Kraton ® G1657M | Kraton ® | Elastomer in compliant layer | Linear triblock copolymer based on styrene and ethylene/butylenes (SEBS), polystyrene content of 13%, Shore A hardness 47 |

TABLE 2-continued

| Resin I.D. | Source | Resin Type | Resin Characteristics |
|---|---|---|---|
| Vistamaxx ™ 6202 | Exxon Mobil Chemical | Elastomer in compliant layer | Specialty thermoplastic elastomer based on semicrystalline polyolefin polymers, ethylene content 15%; Shore A hardness 61 |
| EA3710 | Chevron Phillips Chemical company | Component in compliant layer | Polystyrene |
| 811A | Westlake Polymers | Skin layer resin | Low density polyethylene, 20 MI |
| Profax PDC1292 | Basell Polyolefins | Tie layer secondary component resin | Homopolymer Polypropylene, 34 MFR |
| P4G2Z159 | Huntsman | Tie layer matrix resin | Homopolymer polypropylene, 1.9 MFR |
| P9H8M015PP | Huntsman P9H8M-015 | Component in compliant layer-polymer additive | Amorphous or semi-crystalline polypropylene |

Comparative Example 2

Resin Coated Support Control

Support creation: A photographic rawbase of 170 μm thickness was coated on wireside (backside) with unpigmented polyethylene at a resin coverage of 14 g/m$^2$. On the imaging side of the photographic raw base, a monolayer structure was created by extrusion coating the resins against chill roll A (matte). The layer was composed of 89.75% 811A LDPE, 10% $TiO_2$, and 0.25% zinc stearate. The total coverage was 24.4 g/m$^2$. The resin layer was created by compounding in the Leistritz ZSK27 compounder.

The created support was coated on the imaging side with extruded antistatic tie layer (TL1) and DRL. The antistatic tie layer was melted in the extruder such that it exited the extruder at a temperature around 232° C. The ratio of DRL to antistatic tie layer thickness was 2:1.

Comparative Example 3

Another Resin Coated Support Control

Support creation: A photographic raw base of 170 μm thickness was coated on wireside (backside) with unpigmented polyethylene at a resin coverage of 14 g/m$^2$. On the image side of the photographic raw base, a monolayer structure was created by extrusion coating the resins against chill roll A (matte). The layer was composed of 89.75% Amplify™ EA103, 10% $TiO_2$, and 0.25% zinc stearate. The total coverage was 24.4 g/m$^2$. The resin layer was created by compounding in the Leistritz ZSK27 compounder.

The support created was coated on the imaging side with an extruded antistatic tie layer (TL1) and DRL. The antistatic tie layer was melted in the extruder such that it exited the extruder at a temperature around 232° C. The ratio of DRL to antistatic tie layer thickness was 2:1.

Invention Example 1

Support creation: A photographic raw base of 170 μm thickness was coated on wireside (backside) with unpigmented polyethylene at a resin coverage of 14 g/m$^2$. On the imaging side of the photographic raw base, a monolayer extruded structure of compliant layer was created by extrusion coating the resin layers against chill roll A (matte). The compliant layer was composed of 69.75 wt. % Amplify™ EA103, 20 wt. % Kraton® G1657, 10% $TiO_2$, and 0.25% zinc stearate. The total coverage was 24.4 g/m$^2$. The compliant layer resin was created by compounding in the Leistritz ZSK27 compounder.

The support created was coated with extruded tie layer (TL1) and DRL. The antistatic tie layer was melted in the extruder such that it exited the extruder at a temperature around 232° C. The ratio of DRL to antistatic tie layer thickness was 2:1.

Invention Example 2

Support creation: A photographic raw base of 170 μm thickness was coated on wireside (backside) with unpigmented polyethylene at a resin coverage of 14 g/m$^2$. On the imaging side of the photographic raw base, a monolayer extruded structure of compliant layer was created by extrusion coating the resin layers against chill roll A (matte). The compliant layer was composed of 49.75 wt. % Amplify™ EA103, 40 wt. % Kraton® G1657, 10% $TiO_2$, and 0.25% zinc stearate. The total coverage was 24.4 g/m$^2$. The compliant layer resin was created by compounding in the Leistritz ZSK27 compounder.

The support created was coated with an extruded antistatic tie layer (TL1) and DRL. The antistatic tie layer was melted in the extruder such that it exited the extruder at a temperature around 232° C. The ratio of DRL to antistatic tie layer thickness was 2:1.

Invention Example 3

Support creation: A photographic raw base of 170 μm thickness was coated on wireside (backside) with unpigmented polyethylene at a resin coverage of 14 g/m$^2$. On the imaging side of the photographic raw base, a monolayer extruded structure of compliant layer was created by extrusion coating the resin layers against chill roll A (matte). The compliant layer was composed of 44.78 wt. % Amplify™ EA103, 36 wt. % Kraton® G1657, 9% P9H8M015 PP, 10% $TiO_2$, and 0.25% zinc stearate. The total coverage was 24.4 g/m$^2$. The compliant layer resin was created by compounding in the Leistritz ZSK27 compounder.

The support created was coated with an extruded antistatic tie layer (TL1) and DRL. The antistatic tie layer was melted in the extruder such that it exited the extruder at a temperature around 232° C. The ratio of DRL to antistatic tie layer thickness was 2:1.

Invention Example 4

Support creation: A photographic raw base of 170 μm thickness was coated on wireside (backside) with unpigmented polyethylene at a resin coverage of 14 g/m$^2$. On the imaging side of the photographic raw base, a monolayer extruded structure of compliant layer was created by extrusion coating the resin layers against chill roll A (matte). The compliant layer was composed of 48 wt. % Amplify™ EA103, 32 wt. % Kraton® G1657, 10% P9H8M015 PP, 10% $TiO_2$, and 0.25% zinc stearate. The total coverage was 24.9 g/m$^2$. The compliant layer resin was created by compounding in the Leistritz ZSK27 compounder. The support created was coated with extruded tie layer (TL1) and DRL. The antistatic tie layer was melted in the extruder such that it exited the extruder at a temperature around 232° C. The ratio of DRL to antistatic tie layer thickness was 2:1.

Invention Example 5

Support creation: A photographic raw base of 170 μm thickness was coated on wireside (backside) with unpigmented polyethylene at a resin coverage of 14 g/m$^2$. On the image side of the photographic raw base, a coextruded structure of compliant layer with a skin layer was created by extrusion coating the resins against chill roll C (mirror or smooth glossy), with the skin layer being cast against the chill roll. The compliant layer was composed of 53.6 wt. % Amplify™ EA102, 25.05 wt. % Kraton® G1657, 11% P9H8M015 PP, 10% $TiO_2$, 0.25% zinc stearate, and 0.1% Irganox® 1076. The skin layer was composed of 89.65% 811A LDPE, 10% $TiO_2$, 0.25% zinc stearate, and 0.1% Irganox® 1076. The layer ratio between compliant layer and skin layer was 5:1, while the total coverage was 30.27 g/m$^2$. The compliant layer resin and skin layer resin were both created by compounding in the Leistritz ZSK27 compounder.

The support created was coated on the image side with an extruded antistatic tie layer (TL1) and DRL. The antistatic tie layer was melted in the extruder such that it exited the extruder at a temperature around 232° C. The ratio of DRL to antistatic tie layer thickness was 2:1.

Invention Example 6

Support creation: A photographic raw base of 170 μm thickness was coated on wireside (backside) with unpigmented polyethylene at a resin coverage of 14 g/m$^2$. On the imaging side of the photographic raw base, a coextruded structure of compliant layer with a skin layer was created by extrusion coating the resin layers against chill roll C (mirror or smooth glossy), with the skin layer being cast against the chill roll. The compliant layer was composed of 53.6 wt. % Amplify™ EA102, 25.05 wt. % Kraton® G1657, 11% P9H8M015 PP, 10% $TiO_2$, 0.25% zinc stearate, and 0.1% Irganox® 1076. The skin layer was composed of 89.65% 811A LDPE, 10% $TiO_2$, 0.25% zinc stearate, and 0.1% Irganox® 1076. The layer ratio between compliant layer and skin layer was 5:1, while the total coverage was 30.27 g/m$^2$. The compliant layer resin and skin layer resin were both created by compounding in the Leistritz ZSK27 compounder.

The support created was coated with an extruded antistatic tie layer (TL2) and DRL. The antistatic tie layer was melted in the extruder such that it exited the extruder at a temperature around 232° C. The ratio of DRL to antistatic tie layer thickness was 2:1.

Invention Example 7

Support creation: A photographic raw base of 170 μm thickness was coated on wireside (backside) with unpigmented polyethylene at a resin coverage of 14 g/m$^2$. On the image side of the photographic raw base, a coextruded structure of compliant layer with a skin layer was created by extrusion coating the resin layers against chill roll C (mirror or smooth glossy), with the skin layer being cast against the chill roll. The compliant layer was composed of 53.6 wt. % Amplify™ EA102, 25.05 wt. % Kraton® G1657, 11% P9H8M015 PP, 10% $TiO_2$, 0.25% zinc stearate, and 0.1% Irganox® 1076. The skin layer was composed of 89.65% 811A LDPE, 10% $TiO_2$, 0.25% zinc stearate, and 0.1% Irganox® 1076. The layer ratio between compliant layer and skin layer was 5:1, while the total coverage was 30.27 g/m$^2$. The compliant layer resin and skin layer resin were both created by compounding in the Leistritz ZSK27 compounder.

The support created was coated with an extruded antistatic tie layer (TL3) and DRL. The antistatic tie layer was melted in the extruder such that it exited the extruder at a temperature around 232° C. The ratio of DRL to antistatic tie layer thickness was 2:1.

Invention Example 8

Support creation: A photographic raw base of 170 μm thickness was coated on wireside (backside) with unpigmented polyethylene at a resin coverage of 14 g/m$^2$. On the imaging side of the photographic raw base, a coextruded structure of compliant layer with a skin layer was created by extrusion coating the resin layers against chill roll C (mirror or smooth glossy), with the skin layer being cast against the chill roll. The compliant layer was composed of 53.6 wt. % Amplify™ EA102, 25.05 wt. % Kraton® G1657, 11% EA3710, 10% $TiO_2$, 0.25% zinc stearate, and 0.1% Irganox® 1076. The skin layer was composed of 89.65% 811A LDPE, 10% $TiO_2$, 0.25% zinc stearate, and 0.1% Irganox® 1076. The layer ratio between compliant layer and skin layer was 5:1, while the total coverage was 29.78 g/m$^2$. The compliant layer resin and skin layer resin were both created by compounding in the Leistritz ZSK27 compounder.

The support created was coated with an extruded antistatic tie layer (TL1) and DRL. The antistatic tie layer was melted in the extruder such that it exited the extruder at a temperature around 232° C. The ratio of DRL to antistatic tie layer thickness was 2:1.

Invention Example 9

Support creation: A photographic raw base of 170 μm thickness was coated on wireside (backside) with unpigmented polyethylene at a resin coverage of 14 g/m$^2$. On the imaging side of the photographic raw base, a coextruded structure of compliant layer with a skin layer was created by extrusion coating the resin layers against chill roll C (mirror or smooth glossy), with the skin layer being cast against the chill roll. The compliant layer was composed of 53.6 wt. % Amplify™ EA102, 20.05 wt. % Kraton® G1657, 16% EA3710, 10% $TiO_2$, 0.25% zinc stearate, and 0.1% Irganox® 1076. The skin layer was composed of 89.65% 811A LDPE, 10% $TiO_2$, 0.25% zinc stearate, and 0.1% Irganox® 1076. The layer ratio between compliant layer and skin layer was 5:1, while the total coverage was 29.78 g/$m^2$. The compliant layer resin and skin layer resin were both created by compounding in the Leistritz ZSK27 compounder.

The support created was coated with an extruded antistatic tie layer (TL1) and DRL. The antistatic tie layer was melted in the extruder such that it exited the extruder at a temperature around 232° C. The ratio of DRL to antistatic tie layer thickness was 2:1.

Invention Example 10

Support creation: A photographic raw base of 170 μm thickness was coated on wireside (backside) with unpigmented polyethylene at a resin coverage of 14 g/$m^2$. On the imaging side of the photographic raw base, a coextruded structure of compliant layer with a skin layer was created by extrusion coating the resin layers against chill roll C (mirror or smooth glossy), with the skin layer being cast against the chill roll. The compliant layer was composed of 53.6 wt. % Amplify™ EA102, 20.05 wt. % Kraton® G1657, 5% EA3710, 11% P9H8M015 PP, 10% $TiO_2$, 0.25% zinc stearate, and 0.1% Irganox® 1076. The skin layer was composed of 89.65% 811A LDPE, 10% $TiO_2$, 0.25% zinc stearate, and 0.1% Irganox® 1076. The layer ratio between compliant layer and skin layer was 5:1, while the total coverage was 29.29 g/$m^2$. The compliant layer resin and skin layer resin were both created by compounding in the Leistritz ZSK27 compounder.

The support created was coated with an extruded antistatic tie layer (TL1) and DRL. The antistatic tie layer was melted in the extruder such that it exited the extruder at a temperature around 232° C. The ratio of DRL to antistatic tie layer thickness was 2:1.

Invention Example 11

Support creation: A photographic raw base of 170 μm thickness was coated on wireside (backside) with unpigmented polyethylene at a resin coverage of 14 g/$m^2$. On the imaging side of the photographic raw base, a coextruded structure of compliant layer with a skin layer was created by extrusion coating the resin layers against chill roll C (mirror or smooth glossy), with the skin layer being cast against the chill roll. The compliant layer was composed of 53.8% P9H8M015 PP, 35.9% Vistamaxx™ 6202, 10% $TiO_2$, 0.25% zinc stearate, and 0.1% Irganox® 1076. The skin layer was composed of 89.65% 811A LDPE, 10% $TiO_2$, 0.25% zinc stearate, and 0.1% Irganox® 1076. The layer ratio between compliant layer and skin layer was 5:1, while the total coverage was 27.83 g/m. The compliant layer resin and skin layer resin were both created by compounding in the Leistritz ZSK27 compounder.

The support created was coated with an extruded antistatic tie layer (TL1) and DRL. The antistatic tie layer was melted in the extruder such that it exited the extruder at a temperature around 232° C. The ratio of DRL to antistatic tie layer thickness was 2:1.

Invention Example 12

Support creation: A photographic raw base of 170 μm thickness was coated on wireside (backside) with unpigmented polyethylene at a resin coverage of 14 g/$m^2$. On the imaging side of the photographic raw base, a coextruded structure of compliant layer with a skin layer was created by extrusion coating the resin layers against chill roll A (matte surface), with the skin layer being cast against the chill roll. The compliant layer was composed of 53.6 wt. % Amplify™ EA102, 25.05 wt. % Kraton® G1657, 11% P9H8M015 PP, 10% TiO2, 0.25% zinc stearate, and 0.1% Irganox® 1076. The skin layer was composed of 89.65% 811A LDPE, 10% $TiO_2$, 0.25% zinc stearate, and 0.1% Irganox® 1076. The layer ratio between compliant layer and skin layer was 5:1, while the total coverage was 30.27 g/$m^2$. The compliant layer resin and skin layer resin were both created by compounding in the Leistritz ZSK27 compounder.

The support created was coated with an extruded antistatic tie layer (TL1) and DRL. The antistatic tie layer was melted in the extruder such that it exited the extruder at a temperature around 232° C. The ratio of DRL to antistatic tie layer thickness was 2:1.

Invention Example 13

Support creation: A photographic raw base of 170 μm thickness was coated on wireside (backside) with unpigmented polyethylene at a resin coverage of 14 g/$m^2$. On the imaging side of the photographic raw base, a coextruded structure of compliant layer with a skin layer was created by extrusion coating the resin layers against chill roll B (glossy), with the skin layer being cast against the chill roll. The compliant layer was composed of 53.6 wt. % Amplify™ EA102, 25.05 wt. % Kraton® G1657, 11% P9H8M015 PP, 10% $TiO_2$, 0.25% zinc stearate, and 0.1% Irganox® 1076. The skin layer was composed of 89.65% 811A LDPE, 10% $TiO_2$, 0.25% zinc stearate and 0.1% Irganox® 1076. The layer ratio between compliant layer and skin layer was 5:1, while the total coverage was 28.81 g/$m^2$. The compliant layer resin and skin layer resin were both created by compounding in the Leistritz ZSK27 compounder.

The support created was coated with an extruded antistatic tie layer (TL1) and DRL. The antistatic tie layer was melted in the extruder such that it exited the extruder at a temperature around 232° C. The ratio of DRL to antistatic tie layer thickness was 2:1.

Invention Example 14

Support creation: A photographic raw base of 170 μm thickness was coated on wireside (backside) with unpigmented polyethylene at a resin coverage of 14 g/$m^2$. On the imaging side of the photographic raw base, a coextruded structure of compliant layer with a skin layer was created by extrusion coating the resin layers against chill roll C (mirror or smooth glossy), with the skin layer being cast against the chill roll. The compliant layer was composed of 53.6 wt. % Amplify™ EA102, 25.05 wt. % Kraton® G1657, 11% P9H8M015 PP, 10% $TiO_2$, 0.25% zinc stearate, and 0.1% Irganox® 1076. The skin layer was composed of 89.65% 811A LDPE, 10% TiO2, 0.25% zinc stearate, and 0.1% Irganox® 1076. The layer ratio between compliant layer and skin layer was 5:1, while the total coverage was 29.29 g/$m^2$. The compliant layer resin and skin layer resin were both created by compounding in the Leistritz ZSK27 compounder.

The support created was coated with an extruded antistatic tie layer (TL1) and DRL. The antistatic tie layer was melted in the extruder such that it exited the extruder at a temperature around 232° C. The ratio of DRL to antistatic tie layer thickness was 2:1.

All of the DRL coated samples were printed using a KODAK Thermal Photo Printer, model number 6800 using a KODAK Professional EKTATHERM ribbon, catalogue number 106-7347 donor element. The printed samples were evaluated for "print dropout". These are areas of missing dye in the print, and normally they occur at low optical density. The created samples were all evaluated for adhesion prior to printing, and on the DRL immediately after printing. Adhesion was characterized on unprinted samples using a 3M tape No. 710 with a scribe line placed in the DRL surface to help initiate separation at the correct location.

Surface roughness of the image receiving side of each sample was measured prior to printing and after printing using a Mahr Perthometer Concept stylus profilometer instrumented with a skidless 2 μm radius probe. Each sample was characterized for roughness in 24 locations, and the trace direction was perpendicular to the machine direction. The measurement and analysis were carried out per ASME B.46.1-2002 Standard (classification and designation of surface qualities). Filtering of profiles was performed by employing a roughness long wavelength cutoff of 0.8 mm to 2.5 mm, and a roughness short wavelength cutoff of 2.5 μm. Roughness parameters Ra, Rz, and the number of peaks/cm are reported here. The total number of peaks/cm is a sum total of peaks of height greater than 0.1 μm but less than 0.25 μm, greater than 0.25 μm but less than 0.5 μm, greater than 0.5 μm but less than 1 μm, greater than 1 μm but less than 2 μm but less than 3 μm, and greater than 3 μm, all in a span length of 1 cm.

TABLE 3 above lists the various formulations used in this invention and compares them with existing thermal receiver technology (Comparative Example 1) and other comparative samples (Comparative Examples 2 and 3) that do not contain an elastomer component in their formulations. Comparative Examples 2 and 3 are formulations that show print dropout (lack of printing) at low densities. Addition of an elastomer component such as Kraton® (Invention Examples 1-4) helps print uniformity by eliminating low density print dropout in monolayer formulations. The present invention also highlights the use of coextruded formulation compositions that have no low density dropout as shown in Invention Examples 5-10. Invention Examples 1-10 highlight the addition of a third resin component like polypropylene or polystyrene in small amounts does not cause deterioration of print uniformity. It was also observed that the addition of the third resin component improved conveyance and print slitting (or chopping) properties. Furthermore, Invention Example 11 shows that the addition of Vistamaxx™ elastomer to polypropylene eliminates print non-uniformity.

TABLE 3 also highlights that the technology proposed to eliminate low density print dropout is versatile and it can be used with extruded antistatic tie layers TL1, TL2, or TL3. The present invention is particularly useful with antistatic tie layers that minimize moisture uptake as discussed in U.S. Pat. No. 7,521,173 (Dontula et al.).

TABLE 3

| Imaging Element | Support Coating | Extruded Antistatic Tie Layer | Adhesion prior to printing of extruded antistatic tie layer | Adhesion in 4" × 6" prints (10.2 cm × 15.2 cm) | Low density dropout |
|---|---|---|---|---|---|
| Comparative 1 | Voided laminate | TL1 | Did not delaminate | No delamination | None |
| Comparative 2 | Monolayer (LDPE 811A) | TL1 | Did not delaminate | No delamination | Significant |
| Comparative 3 | Monolayer (Amplify ™ EA 103) | TL1 | Did not delaminate | No delamination | Small, better than Comparative 2 |
| Invention 1 | Compliant monolayer (69.75% Amplify ™ EA103, 20% Kraton® G1657) | TL1 | Did not delaminate | No delamination | None |
| Invention 2 | Compliant monolayer (49.75% Amplify ™ EA103, 40% Kraton ® G1657) | TL1 | Did not delaminate | No delamination | None |
| Invention 3 | Compliant monolayer (44.78% Amplify EA103, 36% Kraton ® G1657, 9% PP) | TL1 | Did not delaminate | No delamination | None |
| Invention 4 | Compliant monolayer (48% Amplify ™ EA103, 32% Kraton ® G1657, 10% P9H8M015PP) | TL1 | Did not delaminate | No delamination | None |
| Invention 5 | Compliant coextruded layer (53.6% Amplify ™ EA102 with 25.05% Kraton ® G1657 and 11% P9H8M015PP, LDPE skin) | TL1 | Did not delaminate | No delamination | None |
| Invention 6 | Compliant coextruded layer (53.6% Amplify ™ EA102 with 25.05% Kraton ® G1657 and 11% P9H8M015PP, LDPE skin) | TL2 | Did not delaminate | No delamination | None |
| Invention 7 | Compliant coextruded layer (53.6% Amplify ™ EA102 with 25.05% Kraton ® G1657 and 11% P9H8M015PP, LDPE skin) | TL3 | Did not delaminate | No delamination | None |
| Invention 8 | Compliant coextruded layer (53.6% Amplify ™ EA102 with 25.05% Kraton ® G1657 and 11% EA3710, LDPE skin) | TL1 | Did not delaminate | No delamination | None |
| Invention 9 | Compliant coextruded layer (53.6% Amplify ™ EA102 with 20.05% Kraton ® G1657 and 16% EA3710, LDPE skin) | TL1 | Did not delaminate | No delamination | None |
| Invention 10 | Compliant coextruded layer (53.6% Amplify ™ EA102 with 20.05% Kraton ® G1657, 5% EA3710, and 11% P9H8M015PP. LDPE skin) | TL1 | Did not delaminate | No delamination | None |
| Invention 11 | Compliant coextruded layer (53.8% P9H8M015PP and 35.9% Vistamaxx ™ 6202, LDPE skin) | TL1 | Did not delaminate | No delamination | None |

TABLE 4 below shows another advantage of using elastomers for creating thermal receiver formulations, maximum print density ($D_{max}$), that is significantly increased in the inventive examples using an extruded compliant layer.

TABLE 4

| Example | Support Coating | Increase in $D_{max}$ Print Density Compared to Comparative Example 2 |
|---|---|---|
| Comparative Example 3 | Monolayer (Amplify ™ EA103) | 0.1 |
| Invention 1 | Compliant monolayer (69.75% Amplify ™ EA103, 20% Kraton ® G1657) | 0.17 |
| Invention 2 | Compliant monolayer (49.75% Amplify ™ EA103, 40% Kraton ® G1657) | 0.26 |
| Invention 3 | Compliant monolayer (44.78% Amplify ™ EA103, 36% Kraton ® G1657 and 9% P9H8M015PP) | 0.29 |

TABLE 5 below highlights another advantage of using melt extrusion technology according to the present invention for creating thermal receiver supports. Coating extruded antistatic tie layers along with extruded DRL technology on supports having different roughness (indicated by Ra, Rz and total peaks/cm) enables thermal printing with no low density dropout. Surface roughness measurements and analysis were done per ASME B46, 1-2002. The total peaks/cm column includes the sum total of number of peaks/cm>0.1 μm, >0.25 μm, >0.5 μm, >1 μm, >2 μm, and >3 μm. From TABLE 5, it is apparent that using the extrudable compliant layer formulations described herein allows supports having a wide range of roughness to be printed. The extruded compliant layer formulations can be rougher than known thermal receiver (Comparative Example 1) and yet eliminate low density dropout. The extruded compliant layer formulations useful in this invention may be created as monolayer or assembled in multilayer structures (co-extruded), and examples of both embodiments are provided here.

The invention has been described in detail with particular reference to certain preferred embodiments thereof, but it will be understood that variations and modifications can be effected within the spirit and scope of the invention.

TABLE 5

| | | Low Density | Roughness prior to Extruded Antistatic Tie Layer and DRL coating | | | Roughness after Extruded Antistatic Tie Layer and DRL coating | | |
|---|---|---|---|---|---|---|---|---|
| Example | Support | Dropout on 6800 Prints | Ra (μm) (stdev) | Rz (μm) (stdev) | Total Peaks/cm | Ra (μm) (stdev) | Rz (μm) (stdev) | Total Peaks/cm |
| Comparative 1 | Voided Laminate | None | 0.123 (0.01) | 0.899 (0.092) | 368.6 | 0.144 (0.016) | 0.997 (0.202) | 379.6 |
| Comparative 2 | Monolayer (LDPE 811A) | Significant | 1.057 (0.044) | 6.919 (0.326) | 1589.1 | 0.567 (0.055) | 3.629 (0.366) | 773.6 |
| Invention 12 | Compliant layer (co-extruded) | None | 1.053 (0.046) | 6.922 (0.386) | 1948.3 | 0.733 (0.057) | 4.682 (0.360) | 990.9 |
| Invention 13 | Compliant layer with skin (co-extruded) | None | 0.116 (0.010) | 0.845 (0.131) | 754.1 | 0.131 (0.026) | 0.954 (0.271) | 495.6 |
| Invention 14 | Compliant Layer with skin (co-extruded) | None | 0.083 (0.014) | 0.674 (0.312) | 88.2 | 0.119 (0.019) | 0.967 (0.258) | 480 |
| Invention 4 | Compliant Layer (monolayer) | None | 1.016 (0.058) | 6.899 (0.560) | 1586.8 | 0.702 (0.095) | 4.684 (0.61) | 836.3 |

The invention claimed is:

1. A method of making a thermal imaging element comprising:
providing a support;
applying to said support, in order:
a non-voided compliant layer that comprises from about 10 to about 40 weight % of at least one elastomeric polymer and from about 35 to about 80 weight % of at least one non-elastomeric matrix polymer,
an antistatic tie layer, and
an image receiving layer,
wherein all three of said non-voided compliant layer, antistatic tie layer, and image receiving layer are extruded onto said support, and at least two of said layers are co-extruded.

2. The method of claim 1 wherein all three of said non-voided compliant layer, antistatic tie layer, and image receiving layer are co-extruded onto said support.

3. The method of claim 1 wherein said support comprises cellulose paper fibers or a synthetic paper.

4. The method of claim 1 wherein said support is laminated to a biaxially oriented polypropylene (BOPP) on its side opposite to said compliant layer.

5. The method of claim 1 wherein said extruded antistatic tie layer absorbs less than 3 weight % of moisture at 80% RH and 22.78° C. and comprises from about 5 to about 30% of a polyether-containing antistatic material in a matrix polymer.

6. The method of claim 1 wherein said elastomeric polymer is present in said extruded compliant layer in an amount of from about 15 to about 30 weight %.

7. The method of claim 1 wherein said elastomeric polymer comprises at least one of a thermoplastic polyolefin blend, styrene/alkylene block copolymer, olefinic block copolymer, polyether block polyamide, copolyester elastomer, ethylene/propylene copolymer, thermoplastic urethane, or a mixture thereof.

8. The method of claim 1 wherein said extruded compliant layer comprises further comprises from about 2 to about 25 weight % of an amorphous or semi-crystalline polymer additive.

9. The method of claim 8 wherein said amorphous or semicrystalline polymer additive is polypropylene, polystyrene, or maleated polyethylene.

10. The method of claim 1 further comprising extruding a skin layer immediately adjacent either or both sides of said extruded compliant layer.

11. The method of claim 10 comprising co-extruding said skin layer(s) and said compliant layer.

12. The method of claim 1 wherein said compliant layer is extruded as a formulation having a shear viscosity of from about 1000 to about 100,000 poise at 200° C. and a shear rate of 1 $s^{-1}$.

13. The method of claim 1 wherein said image receiving layer, extruded antistatic tie layer, extruded compliant layer, and optional extruded skin layer(s) are extruded onto a support.

14. The method of claim 1 wherein said compliant layer is provided to a final thickness of from about 15 to about 70 μm, said antistatic tie layer is provided to a final thickness of from about 0.5 to about 10 μm, and said image receiving layer is provided to a final thickness of from about 1 to about 8 μm.

15. The method of claim 1 wherein the non-voided compliant layer comprises from about 15 to about 30 weight % of the at least one elastomeric polymer, and from about 40 to about 65 weight % of a non-elastomeric matrix polymer.

16. A method of forming a thermal imaging element comprising:

A) forming a first melt for a non-voided compliant layer, comprising from about 10 to about 40 weight % at least one elastomeric polymer and at least 35 to about 80 weight % of one non-elastomeric matrix polymer, B) forming a second melt for an antistatic tie layer comprising a thermoplastic antistatic polymer, C) forming a third melt for an image receiving layer, and D) co-extruding said three melts to form a composite film.

17. The method of claim 16 further comprising:

E) stretching said composite film to reduce its thickness, and

F) applying said stretched composite film to a support.

18. The method of claim 16 wherein said first melt comprises at least one of a thermoplastic polyolefin blend, styrene/alkylene block copolymer, polyether block polyamide, copolyester elastomer, ethylene/propylene copolymer, thermoplastic urethane, ethylene propylene copolymer, olefinic block copolymer, or a mixture thereof to provide the non-voided compliant layer, said second melt comprises an antistatic polymer that is a polyether-block copolyamide, polyetheresteramide, segmented polyether urethane, or polyether-block-polyolefin to provide the antistatic tie layer, and said third melt comprises a polymer that is a polyester, polycarbonate, polyurethane, polyvinyl chloride, poly(styrene-co-acrylonitrile), poly(caprolactone), or mixture of any two or more of these, to provide a dye-receiving layer.

* * * * *